No. 831,910. PATENTED SEPT. 25, 1906.
R. E. VALENTINE.
ROLL FOR MACHINES FOR PREPARING CEREALS.
APPLICATION FILED JUNE 28, 1905.
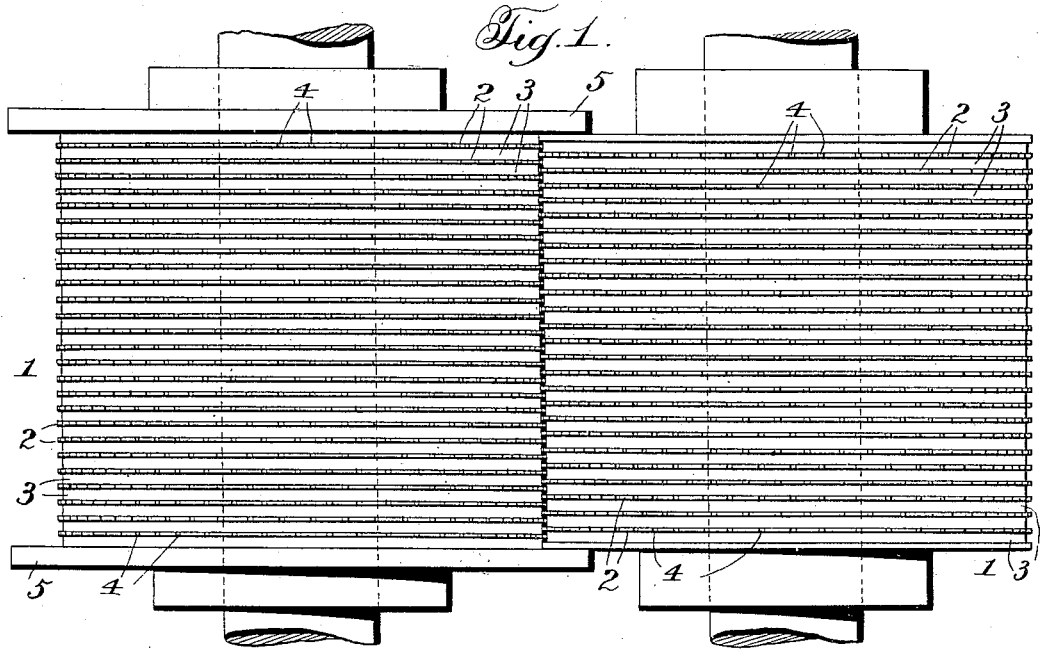
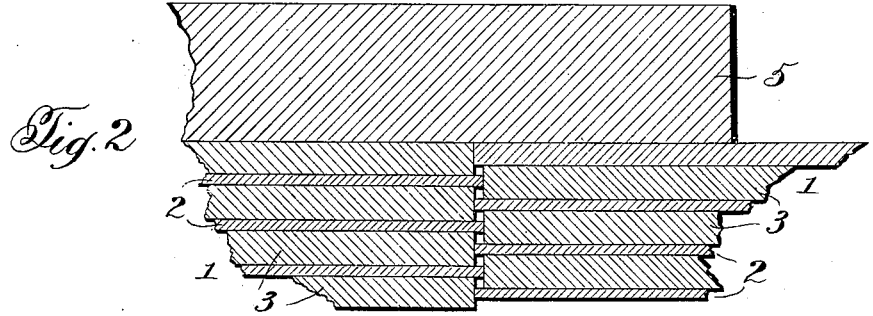
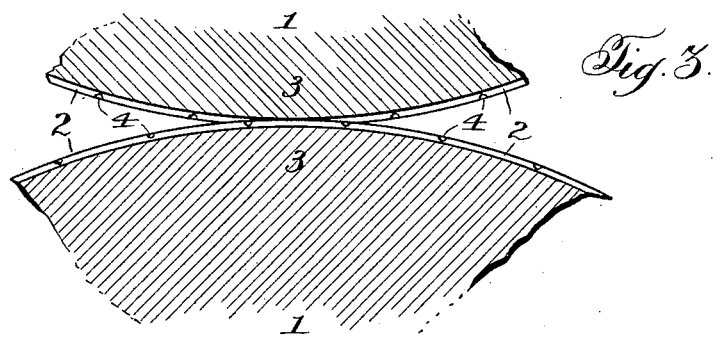

UNITED STATES PATENT OFFICE.

RALPH E. VALENTINE, OF WORCESTER, MASSACHUSETTS.

ROLL FOR MACHINES FOR PREPARING CEREALS.

No. 831,910. Specification of Letters Patent. Patented Sept. 25, 1906.

Application filed June 28, 1905. Serial No. 267,393.

*To all whom it may concern:*

Be it known that I, RALPH E. VALENTINE, a citizen of the United States, residing at Worcester, in the county of Worcester and State of Massachusetts, have invented certain new and useful Improvements in Rolls for Machines for Preparing Cereals; and I do hereby declare the following to be a full, clear, and exact description of the invention, such as will enable others skilled in the art to which it appertains to make and use the same.

This invention relates to improvements in rolls of machines for preparing cereals, and is especially related to machines of that type whereby cereals are shredded.

In the ordinary shredding-machine it is customary to employ scrapers for freeing the rolls of the cereal after the latter has passed between the rolls, the cereal having a tendency to adhere to the rolls, and this adhesion of the cereal to the rolls is due to the form of the latter commonly employed.

It is therefore the object of the present invention to provide a novel construction of shredding-roll which will entirely eliminate the use of scrapers in shredding-machines and by the use of which the cereal will be freely disengaged from the rolls immediately upon leaving the point at which the shredding is effected.

A further object sought to be accomplished is the provision of a shredding-roll which is so constructed that the same may be readily reground or sharpened after becoming dull, thereby enabling a single roll to be repeatedly used and overcoming the necessity for purchasing additional rolls.

The invention also aims to provide a shredding-roll having its periphery so formed that when brought into operative relation with a coacting roll or rolls a multiplicity of regularly-formed interstices will be provided for the effective formation of the cereal filaments.

Other objects are also in view, which will become apparent as the nature of the invention is better understood; and to such ends the invention consists, substantially, in the novel construction, combination, and arrangement of parts, as will be hereinafter fully described, illustrated in the accompanying drawings, and pointed out in the appended claims.

In the drawings, Figure 1 is a plan view, on a greatly-enlarged scale, of a pair of shredding-rolls constructed in accordance with the present invention. Fig. 2 is a longitudinal sectional view thereof. Fig. 3 is a transverse sectional view of the rolls.

Referring in detail to the drawings, the numeral 1 designates the herein-described roll, said roll being formed of a series of major disks 2 and a series of minor disks 3, said disks being formed of steel or other suitable material.

The major disks 2 are of greater diameter than the minor disks 3, and in thickness they are preferably one-third the thickness of the minor disks 3. This provides a comparatively wide space between the respective disks 2, and said spaces thereby form a series of circumferential grooves having regularly-defined configuration. The diameter of each minor disk 3 plus two-thirds the thickness thereof is equal to the diameter of one of the major disks 2, and the purpose of this proportion is to form when the rolls are assembled in contiguous relation a multiplicity of interstices having regularly-defined configuration and through which the cereal must pass in order that shredding thereof may be effected.

It will be observed that the major and minor disks are arranged in alternate relation, and therefore when contiguous rolls are assembled the formation of the small interstices is assured, which interstices, as shown in the drawings, will be perfectly square, the opposite sides of the interstices being formed by the opposite rolls.

If desired, each of the major disks 2 may be provided with a series of axial grooves or notches 4, and one of the rolls is also provided at its ends with flanges 5, the diameter of which is greater than the diameter of the roll, so that when the rolls are assembled in contiguous relation said end flanges will overlap or embrace the ends of the contiguous roll, and thus prevent displacement of the cereal from the ends of the rolls.

In constructing the herein-described roll the major and minor disks are respectively mounted upon suitable arbors and made of a uniform diameter, and in the subsequent building of the roll it will thus be seen that all of the major disks and all of the minor disks are uniform, so that when the rolls are assembled in contiguous relation a perfect contact is assured by the uniform difference in diameter between the major and minor disks.

If desired, the axial grooves 4 may be arranged in staggered relation, and when assembling a plurality of the rolls the same may be set so that the axial grooves of the rolls will not come together or register.

In the use of rolls constructed in accordance with the present invention it is obvious that as the cereal is fed to the same, the rolls rotating toward each other, and thereby causing the space between the same to converge as two given points on the rolls approach each other, the cereal will pass into the interstices formed by the major disks, which interstices become filled, and as the cereal passes between the rolls a filament is formed, which filaments are free to fall after passing the shredding-point by reason of the space between the surfaces of the rolls diverging. The opposite sides of the square interstices formed by the opposite rolls impart to the filaments a tendency to adhere thereto, and this adhesion to the sides of the interstices will tend to rotate the filaments, thus freeing the same from contact with the roll-surfaces and the sides of the interstices and allowing the filaments to take a downward course due to their own weight.

In the use of the axial grooves the filaments formed in the interstices will be joined by other filaments formed by the grooves, and these connecting filaments extending between the otherwise continuous filaments will prevent any of those formed by the interstices being displaced or straying from the main body of the shredded cereal. The flanges 5 on one of the rolls prevent the cereal passing from the ends of those assembled.

Having thus described the invention, what is claimed as new, and desired to be secured by Letters Patent, is—

1. A roll of the character described, comprising a series of major disks, and a series of minor disks of less diameter than the diameter of the major disks, said major and minor disks being arranged in alternate relation and forming a series of circumferential grooves having regularly-defined configuration, the minor disks being of greater thickness than the major disks whereby the grooves formed by said disks are adapted to freely receive the major disks of a contiguous roll and thereby form a series of interstices of regularly-defined configuration.

2. A roll of the character described, comprising a series of disks of different diameters arranged in alternate relation and forming a series of circumferential grooves having regularly-defined configuration, and flanges formed upon the ends of said roll and of greater diameter than that of the disks, whereby when said roll is assembled with a contiguous roll having no flanges the cereal will be prevented passing over the ends of the rolls, the minor disks being of greater thickness than the major disks whereby the grooves formed by said disks are adapted to freely receive the major disks of a contiguous roll and thereby form a series of interstices of regularly-defined configuration.

3. A roll of the character described, comprising a series of major disks, and a series of minor disks of less diameter than the diameter of the major disks, said major and minor disks being arranged in alternate relation and forming a series of circumferential grooves having regularly-defined configuration, the periphery of each major disk having a series of axial grooves formed therein, the minor disks being of greater thickness than the major disks whereby the grooves formed by said disks are adapted to freely receive the major disks of a contiguous roll and thereby form a series of interstices of regularly-defined configuration.

4. A roll of the character described, comprising a series of major disks, and a series of minor disks of less diameter than the diameter of the major disks, said major and minor disks being arranged in alternate relation and forming a series of circumferential grooves having regularly-defined configuration, the periphery of each major disk having a series of axial grooves formed therein and arranged in staggered relation.

In testimony whereof I affix my signature in the presence of two witnesses.

RALPH E. VALENTINE.

Witnesses:
  HENRY E. COOPER,
  FANNIE R. FITTON.